United States Patent [19]
Urabe et al.

[11] Patent Number: 4,591,904
[45] Date of Patent: May 27, 1986

[54] PICTURE IMAGE INPUT/OUTPUT SYSTEM

[75] Inventors: Hitoshi Urabe; Masayuki Matsumoto; Hisashi Kudo; Osamu Shimazaki, all of Kaisei, Japan

[73] Assignee: Fuji Photo Film Co., Ltd., Kanagawa, Japan

[21] Appl. No.: 504,511

[22] Filed: Jun. 15, 1983

[30] Foreign Application Priority Data

Jul. 9, 1982 [JP] Japan .................. 57-120329

[51] Int. Cl.⁴ .............................. H04N 1/46
[52] U.S. Cl. .................... 358/75; 358/287; 358/291
[58] Field of Search .................... 358/75–80, 358/291, 287, 285

[56] References Cited

U.S. PATENT DOCUMENTS 3,015,690  1/1962  Mason et al. ............. 358/291
4,305,093 12/1981  Nasu ........................ 358/80
4,305,094 12/1981  Yamada .................... 358/80
4,315,280  2/1982  Tsuda ....................... 358/80
4,472,736  9/1984  Ushio ....................... 358/75

OTHER PUBLICATIONS

Newman, William M., "Principles of Interactive Computer Graphics", Second Edition, 1979, pp. 367–370, 386, 387, 388.

Primary Examiner—Michael A. Masinick
Attorney, Agent, or Firm—Wenderoth, Lind & Ponack

[57] ABSTRACT

A picture image input/output system which can obviate defects encountered in prior art systems is arranged such that plural original color pictures are enlarged or reduced at a predetermined magnification ratio respectively by a picture image scanning device and color separated to obtain color separation signals; such color separation signals are processed for appropriate color correction, sharpness enhancement and gradation conversion, and lay-out picture images are sequentially outputted on a recording material using lay-out instructions and information.

21 Claims, 26 Drawing Figures

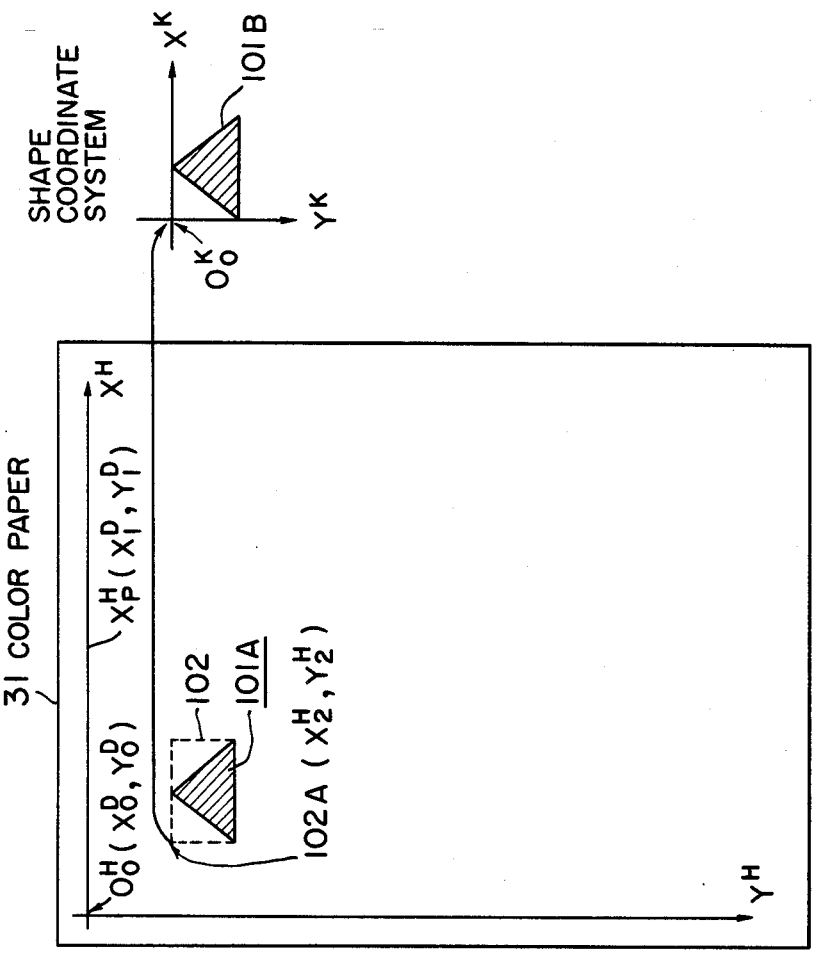

PICTURE IMAGE INPUT/OUTPUT SYSTEM

BACKGROUND OF THE INVENTION

This invention relates to a picture image input/output system, and more particularly to a picture image input/output system which enlarges or reduces at a designated magnification and color-separates each original color picture by means of an image scanning device such as a color scanner to obtain color separation signals, and processes the color separation signals for appropriate color correction, sharpness enhancement and gradation conversion, and sequentially outputs images on a recording material in a lay-out which is commanded by a lay-out command data inputted by a digitizer or the like.

There has been proposed a method for laying out each one of color separated films of plural original color pictures by preparing a screened color-separated film in a predetermined magnification out of respective original pictures by means of a color scanner, and then laying out and composing a masked separation printer which is prepared separately and the screened color-separated film on lay-out sheet and then contact-exposing them to obtain a laid-out color-separated film for each color. The method, however, is defective in that it requires a large number of complex processing steps, much time and labor, materials and a high degree of skill for registering the color-separated films at predetermined positions on the lay-out sheet for composing. There has been also proposed another method for reproducing a laid out color picture image by colorprinting plural original color pictures respectively at predetermined magnification, and then cutting out the thus prepared reproduction of original pictures in a predetermined rough-sketch form and laying out and composing them at a predetermined position on a base paper. This method, however, is problematic in its image quality because as this method involves the use of photographic techniques, it is impossible to arbitrarily change the processing conditions for color correction, sharpness enhancement, gradation conversion and so on. A device to output rectangular picture images in laid-out form by means of plural input devices, for example that which is disclosed in Japanese Patent Publication No. 31762/1977, has been contrived; however, the device cannot deal with arbitrary diagrams, and requires manual operation for preparing masked plates, and needs plural input scanning means for the color manuscript input.

In recent years a total-system or a lay-out retouching system has been proposed for processing in printing. Graphic patterns are inputted by a digitizer so as to display the graphic and image patterns on a color CRT (Braun tube) according to the system. Original color pictures are color-scanned at a predetermined magnification, AID-converted and stored in a memory such as a magnetic disk. The stored original color picture data are displayed on the color CRT in accordance with inputted graphic data, and edited in a main memory unit of a computer using interactive inputs and stored again in a magnetic disk or the like in a format corresponding to an output picture image. The thus edited color picture image data are then D/A-converted, and inputted to an output control circuit of a color scanner to obtain a picture image in a desired lay-out. The above mentioned lay-out retouching system, however, is defective in that it requires a magnetic disk or other media of a large capacity for storing data for original color pictures, and needs a high-speed computer for the editing process, thereby pushing up the cost for constructing such systems, and extending the time required for editing.

SUMMARY OF THE INVENTION

Accordingly, an object of this invention is to provide a picture image input/output system which obviates the aforementioned defects.

Another object of this invention is to provide a picture image input/output apparatus which can automatically set the image processing conditions and which does not require the time and skill needed in the conventional systems which photoelectronically scan color manuscripts to obtain the color separation signals, and logarithmically transform and process them for color, sharpness, gradation for output. As parameters for color, sharpness and gradation are set by an operator based on trial and error in the conventional systems, a sophisticated skill and experience as well as a large amount of time are unavoidably involved.

Still another object of this invention is to provide a method which can correctly and easily position an input picture image on an input drum and a digitizer (a graphic input device), and which is suitable for a picture image input/output system to output an image on the input drum in a lay-out at a designated position and magnification to the recording material on an output drum in accordance with the pattern which is inputted by the digitizer.

The nature, principle and utility of the invention will become more apparent from the following detailed description when read in conjunction with the accompanying drawings.

BRIEF DESCRIPTION OF THE DRAWINGS

In the accompanying drawings:

FIGS. 7A to 7D, FIG. 8, FIG. 9, and FIGS. 10A and 10B are diagrams to explain the coordinate relationship among respective devices, respectively;

DESCRIPTION OF THE PREFERRED EMBODIMENT

This invention will now be described referring to attached drawings.

Figure 1:
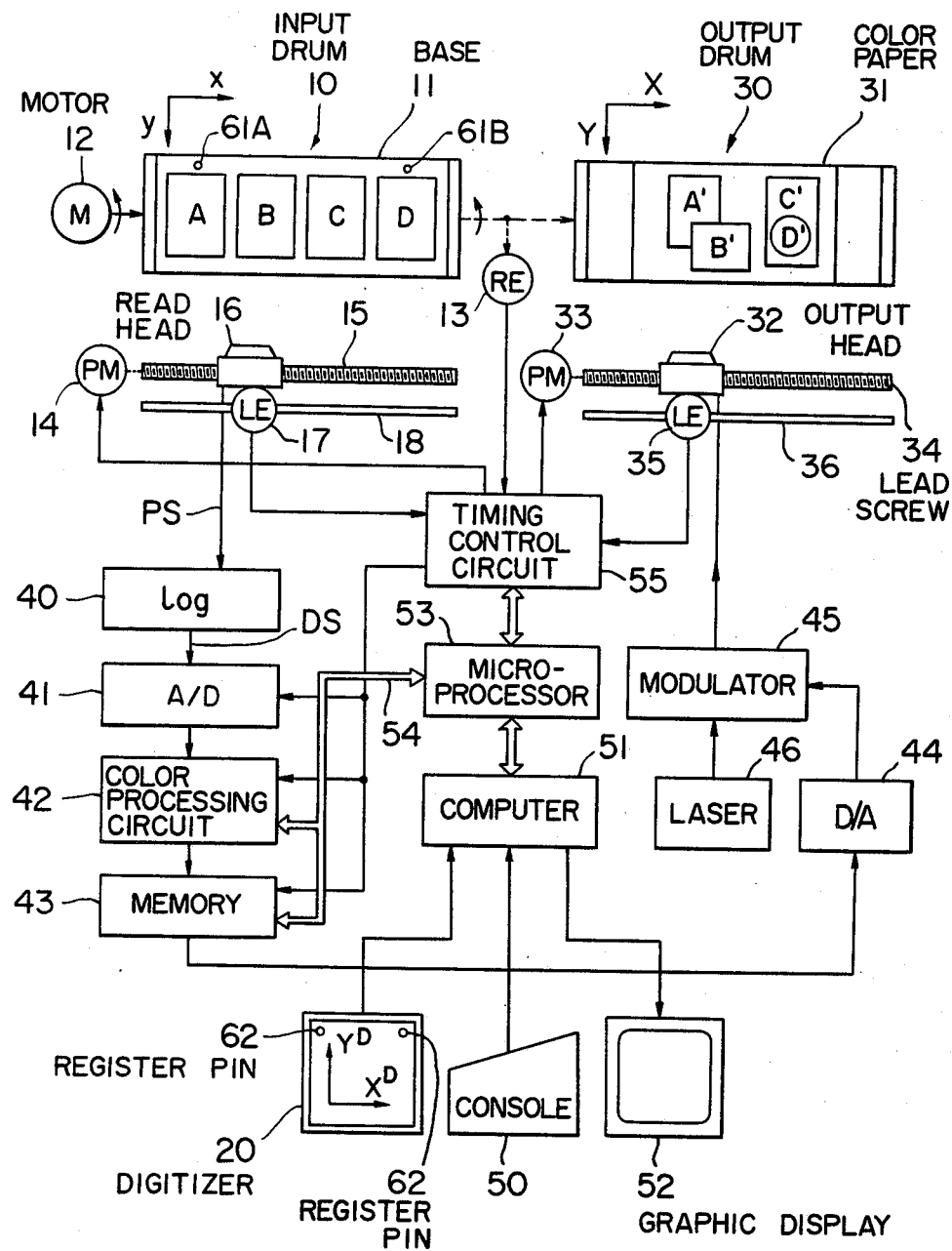
FIG. 1 is a block diagram to show an embodiment of the apparatus according to this invention.
Figure 2:
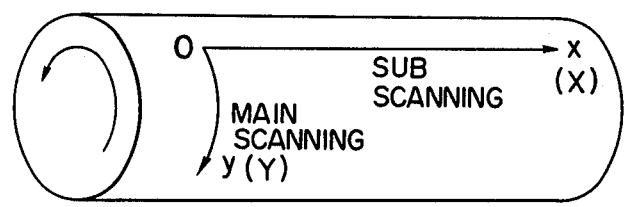
FIG. 2 is a view to show the aspect of scanning of an input (output) drum.

FIG. 1 is a block diagram of an embodiment of a picture image input/output system according to this invention. In the figure, original color pictures A, B, C and D which are mounted on a transparent base 11 of an input drum 10 are outputted on a recording material such as a color paper 31 on an output drum 30 as laid-out picture images A', B', C' and D' in accordance with the data which has been inputted graphically by a digitizer 20 as a graphic pattern input device. The input drum 10 and the output drum 30 both have a cylindrical structure as shown in FIG. 2 and are rotated in one direction (main scanning direction) by a motor 12. The rotating position (main scanning position) of the drums are detected by a rotary encoder 13 connected to an output shaft. The original color pictures A through D mounted on the input drum 10 are color-separated by a read head 16 which is moved in the direction x (sub scanning direction) through a pulse motor 14 and a lead screw 15 to read out image information, and color separation signals PS (3-color separation signals and unsharp signal) are inputted to a logarithmic circuit 40, converted to density signals DS, and then converted to digital signals in an A/D converter 41. The density signals DS which have been converted to digital signals in the A/D converter 41 are inputted to a color processing circuit 42 for color correction, sharpness enhancement, gradation conversion, etc. and the color-processed image data are stored in a memory 43. The data stored in the memory 43 are converted into analog signals by a D/A converter 44, and are inputted to a modulator 45 in a laser beam printer to modulate the laser beam (the laser beam of blue, green and red or three laser beams of different wavelengths in false color) outputted from a laser 46 so as to expose the color paper 31 mounted on the output drum 30 via an output head 32. The output-head 32 is moved in the direction of X (sub scanning direction) via a pulse motor 33 and a lead screw 34 connected thereto.

There is provided a console 50 with a keyboard used as a data and command input device. The data from the console 50 are inputted to a computer 51 (e.g., a mini-computer) and the information processed in the computer 51 is displayed on a graphic display 52 of an interactive type. The computer 51 is further coupled to a microprocessor 53 of an inferior system, this microprocessor 53 being mutually connected to the color processing circuit 42 and the memory 43 by a bus line 54. The computer 51 and the microprocessor 53 form the computer system used to display commands for operators on a graphic display 52 according to the stored program. The position x of the read head 16 is detected by a linear encoder 17 which is engaged with a guide rail 18 and the position data thereof are inputted to a timing control circuit 55. The position X of the output head 32 is detected by a linear encoder 35 engaged with a guide rail 36 and the position data thereof are inputted to the timing control circuit 55. The positions on the y axis of the input drum 10 and those on the Y axis of the output drum 30 are therefore detected by the rotary encoder 13 coupled with the rotating shaft thereof, and the position information thereof are inputted to the timing control circuit 55. The timing control circuit 55 drives, through the computer 51 and the microprocessor 53, the pulse motor 33 at a constant speed at the time of input/output of picture images, and controls the driving speed of the pulse motor 14 and controls the timing of the A/D converter 41, and the color processing circuit 42 and the memory 43.

The above description briefly explains the structure of the picture image input/output apparatus according to this invention and the coordinate relationship respective devices will now be described below.

The coordinate transformation on the digitizer 20 is first described.

Figure 3:
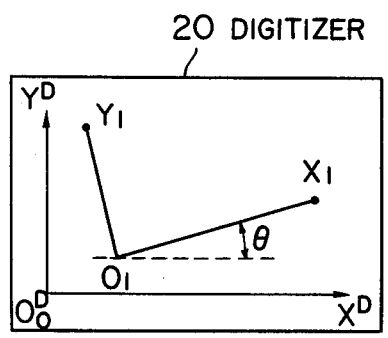
FIG. 3 and FIG. 4 are explanatory diagrams to describe the relationship between coordinates of a digitizer and that of an output drum.

The digitizer 20 has its own proper original and X-Y axes, but the origin can be moved to an arbitrary point by operation and the coordinates can be rotated easily. In FIG. 3, assuming that the proper origin of the device is $O_0^D$, the abscissa $X^D$, and the ordinate $Y^D$, and assuming that after inputting through operation in the digitizer 20 a new origin $O_1$ and a point $X_1$ on a new abscissa X, the coordinate values of the points $O_1$ and $X_1$ in the proper coordinate system of the device are $(x_0^D, y_0^D)$ and $(x_1^D, y_1^D)$, an arbitrary point $(X_n^D, y_n^D)$ in the proper coordinate system of the device will become transformed to a point $(x_n, y_n)$ on a new coordinate system according to the formula shown below:

$$\begin{bmatrix} x_n \\ y_n \end{bmatrix} = \begin{bmatrix} \cos\theta & \sin\theta \\ -\sin\theta & \cos\theta \end{bmatrix} \begin{bmatrix} x_n^D - x_0^D \\ y_n^D - y_0^D \end{bmatrix} \quad (1)$$

wherein $\theta$ is an angle formed between the axis $X^D$ proper to the device and a straight line $\overline{O_1 X_1}$, and wherein the counterclockwise direction is positive. All of the computations according to the above formula can be conducted by the computer 51.

The supervision on the coordinates of the input/output drums will now be described.

In respect of the input drum 10 and the output drum 30, the main scanning (rotation) direction is on the y and Y axes while the sub scanning (transversal shift) direction is on the x and X axes. The coordinates of the read head 16 are measured in the timing control circuit 55 according to the following method. The method comprises the steps of multiplying the output of the rotary encoder 13 coupled with the rotational shaft of the input drum 10 in a PLL (Phase-Locked Loop) circuit, and resetting the counter at the origin of the y axis, and computing the output pulses from the PLL circuit to obtain an ordinate. The multiplication constant for the period of the output pulse from the PLL circuit is determined so as to make it 50 [μm] or 10 [μm] on the input drum 10. The abscissa coordinates are controlled by resetting the counter at the origin on the abscissa, and counting the output pulses from the linear encoder 17 to know the position of the read-head 16 on the abscissa. Abscissa coordinates of the output drum 30 are controlled in a manner similar to that used for the input drum 10. Ordinates Y of the output drum 30 can be controlled in a manner similar to that of ordinates y since the input drum 10 and the output drum 30 are synchronized in rotation.

Correspondence between the coordinate system of the digitizer 20 and the coordinate system of the input drum 10 will be described.

The digitizer 20 is made to correspond with the input drum 10 in their coordinate systems using the transparent base 11 as a medium. More particularly, the input drum 10 is provided with register pins 61A and 61B. The transparent base 11 is provided with register pin holes at positions corresponding to those pins 61A and 61B so as to be mounted on the input drum 10. The digitizer 20 is provided with a register pin 62 (or a pattern of identical plane type) at a position corresponding to the register pins 61A and 61B of the input drum 10 so that the transparent base 11 can be positioned with the digitizer 20 by means of pins.

Although two register pin holes are bored along the upper side of the transparent base 11 in the above description, the position, shape and number of the pin holes may be determined arbitrarily so far as the digitizer 20 and the input drum 10 are provided with pins to correspond therewith. The base may not necessarily be transparent so far as it allows base manuscript input and picture image input.

According to this invention, two types of inputs concerning graphic patterns, such as coordinates, are available. One is the graphic patterns input to designate the shape of output pictures and the other is the base manuscript input to designate which graphic pattern of the output pictures should correspond to the color original pictures A to D for read-out. The graphic pattern input is the operation to receive a graphic pattern from the digitizer 20 as an input and to compare it to the picture frame on the output drum 30 and is quite similar to the pattern input which is carried out usually by a rough sketch plotter. The base manuscript input has a function mainly to compare the coordinates of the transparent base 11 attached with plural original color pictures (A to D) to that of the input drum 10 and to relate the respective original color pictures on the transparent base 11 with the above mentioned input graphic patterns with respect to position and magnification. The following will explain how to operate the graphic pattern input.

Figure 4:
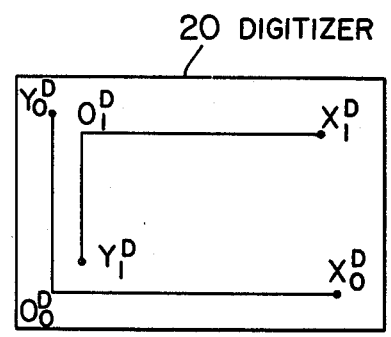

First of all, the coordinates of the digitizer 20 and those of the output drum 30 will correspond. In short, as shown in FIG. 4, the reference symbol $O_0^D$ denotes the origin proper to the digitizer 20, $X_0^D$ and $Y_0^D$ points on the abscissa and ordinate proper to the digitizer 20, $O_1^D$, which is a point on the digitizer 20 which corresponds to the origin of the output drum 30, and $X_1^D$ and $Y_1^D$ are points on the digitizer 20 which correspond to the points on the abscissa X and the ordinate Y of the output drum 30. If the points $O_1^D$ and $X_1^D$ are set to make the straight lines $\overline{O_0^D X_0^D}$ and $\overline{O_1^D X_1^D}$ parallel to each other and the proper coordinate of the point $O_1^D$ on the digitizer 20 is ($x_0^D$, $y_0^D$), then an arbitrary point ($x_n^D$, $y_n^D$) on the digitizer 20 will be transformed into a point ($X_n$, $Y_n$) on the coordinate system of the output drum 30 as expressed by the formula shown below.

$$\begin{bmatrix} X_n \\ Y_n \end{bmatrix} = \begin{bmatrix} x_n^D - x_0^D \\ -(y_n^D - y_0^D) \end{bmatrix} \quad (2)$$

Figure 5A:
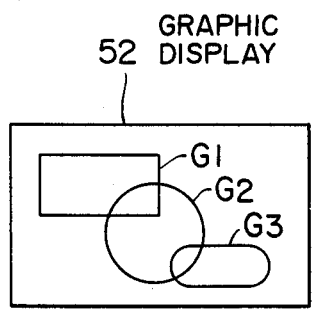
FIGS. 5A and 5B are explanatory diagrams for processing hidden surfaces.
Figure 5B:
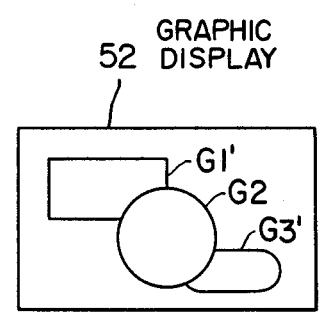

In this manner, the coordinates on the digitizer 20 can be transformed to the coordinates on the output drum 30. If the output size on the output drum 30 is commanded first by the console 50, the output size frame which has been transformed at an appropriate ratio will be displayed on the graphic display 52. Then, if a graphic code (such as a rectangular or a circle) and necessary coordinates are inputted by the digitizer 20 as a rough sketch pattern, the computer 51 will compute the coordinate transformation described above and the magnification transformation and any other operations necessary for the display on the graphic display 52, and consequently, a graphic pattern will be displayed at a position and of a size designated on the graphic display 52. Every time a new graphic code and a new coordinate point are inputted, the computer 51 controls the graphic display 52 so as to multiplex the frame and the graphic patterns which have been previously inputted thereto. As rough sketches are inputted in this manner, an operator can visually confirm the display by using the graphic display 52. When graphic patterns overlap each other, the hidden surface processing to be described hereinbelow must be conducted by inputting the command for the hidden surface in the digitizer 20 and the console 50, and causing the computer 51 to carry out the processing to complete a rough sketch information. In the case that the output picture on the graphic display 52 consists of overlapping patterns G1 through G3 as shown in FIG. 5A, the hidden surface processing will be conducted as shown in FIG. 5B by inputting, for instance "G1<G2, G2>G3" by the console 50.

Figure 6A:
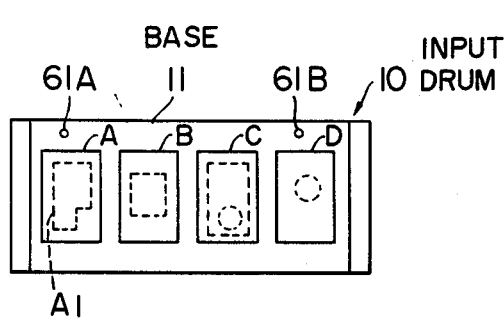
FIGS. 6A and 6B are views to explain the relationship between original input pictures and laid-out picture images.
Figure 6B:
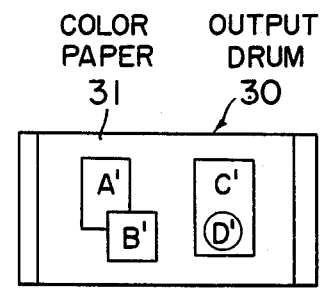

The base manuscript input will now be described referring to FIGS. 6A and 6B.

The base manuscript input is carried out by the digitizer 20 as follows: i.e., the steps of comparing the coordinates of the transparent base 11 attached with original color pictures A to D to those of the input drum 10, and detecting through a console 50 the corresponding relationship between respective original color pictures on the transparent base 11 and the rough sketch pattern which has been inputted by the graphic pattern input operation described above. The transparent base 11 attached with plural original color pictures A to D is fixed on the digitizer 20 by positioning it with register pins 62, 62. Coordinates of the transparent base 11 fixed on the digitizer 20 are transformed to coordinates of the input drum 10 in a manner similar to that explained concerning the transformation from the digitizer 20 to the output drum 30 in the graphic pattern input operation. Then, the rough sketch pattern which has been inputted is compared with the coordinates of the original pictures A to D on the transparent base 11 with respect to the magnification factor. In other words, in FIGS. 6A and 6B, the output pattern A' corresponds with the original picture A, but in order for the broken line A1 in the original picture A to correspond to the pattern A', a point in the picture A should correspond in coordinates with a point in the pattern A' and the magnification necessary for enlarging or reducing the broken line A1 to the graphic pattern A' should be determined. If these are satisfied, the coordinate relationship will become absolutely determined. This is conducted simply by position-inputting a point in the graphic pattern A' and a point in the original picture A for coordinate correspondence by the digitizer 20 and inputting the magnification value by the console 50. The original pictures B to D and the output pictures B' to D' are also compared in a fashion which is identical with the operation described above.

The coordinate supervision between the coordinates of the digitizer 20 and those of the input drum 10 and the output drum 30 will be explained.

The position, shape and size of the picture to be laid out as an output on the color paper 31 mounted on the output drum 30 as a rough sketch are inputted by the digitizer 20, thereby defining the pattern on the coordinate system (the rough sketch coordinate system) which defines the rough sketch, and the thus defined graphic patterns are respectively supervised.

Figure 7B:
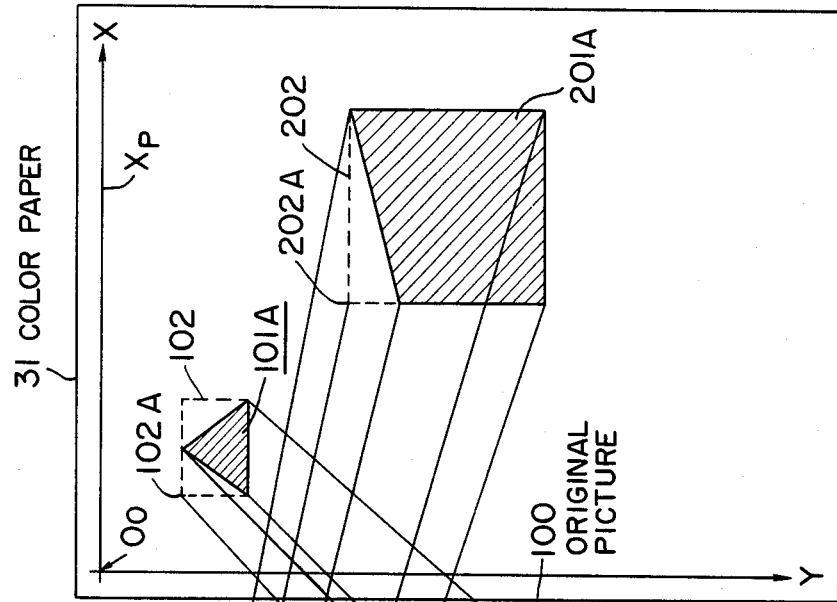
Figure 7A:
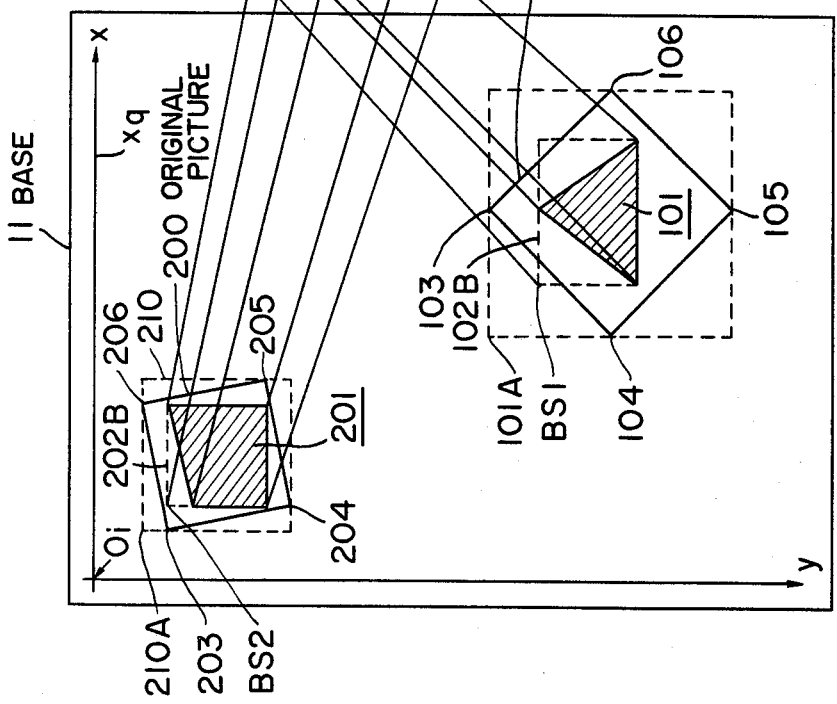

FIGS. 7A and 7B show the case where the picture images defined by the hatched areas 101 and 201 of the input original pictures 100 and 200 mounted on the transparent base 11 on the input drum 10 are outputted in lay-out to the hatched areas 101A and 201A defined on the color paper 31 mounted on the output drum 30. However, for facilitating understanding, an explanation will be given on the case where an input original picture 100 is outputted in lay-out in the area 101A of the rough sketch or the scope defined by hatched lines on the color paper 31 mounted on the output drum 30. It is assumed that respective coordinate systems have the origin at left upper point, and the abscissa axis X extends from left to right and the ordinate axis Y extends from top to bottom in the description given below. The origin $O_0{}^H$ and a point either on $X^H$ or $Y^H$ axis of the rough sketch 101A shown in FIG. 7C are designated by the digitizer 20. Coordinates of such designated points on the digitizer 20 are inputted to the computer 51 and the computer 51 computes the discrepancy between the coordinates of the digitizer 20 and the coordinate of the rough sketch. At this time, the coordinate origin $O_0{}^H$ of the rough sketch pattern on the digitizer 20 and the point $X_p{}^H$ on the abscissa are inputted in coordinates thereof as expressed in the formula below:

$$\text{point } 0_0{}^H = X_0{}^D, Y_0{}^D$$

$$\text{point } X_p{}^H = X_1{}^D, Y_1{}^D$$

The coordinates of the rough sketch are displaced in parallel by $X_0{}^D$ in the $X^D$ direction and by $Y_0{}^D$ in the $Y^D$ direction on the coordinate system of the digitizer 20, and the pattern is rotated by the angle $\theta$ around the point.

$$\cos\theta = \frac{X_1{}^D - X_0{}^D}{\sqrt{(X_1{}^D - X_0{}^D)^2 + (Y_1{}^D - Y_0{}^D)^2}} \quad (3)$$

$$\sin\theta = \frac{Y_1{}^D - Y_0{}^D}{\sqrt{(X_1{}^D - X_0{}^D)^2 + (Y_1{}^D - Y_0{}^D)^2}}$$

The above mentioned instruction is recognized by the computer 51. If an arbitrary point of the rough sketch which is read by the digitizer 20 is assumed to be $(X^D, Y^D)$ in the coordinates on the digitizer 20, the coordinates $(X_1{}^H, Y_1{}^H)$ on the rough sketch are expressed in the formula below:

$$[X_1{}^H \; Y_1{}^H \; 1] = [X^D \; Y^D \; 1] \begin{bmatrix} 1 & 0 & 0 \\ 0 & 1 & 0 \\ -X_0{}^D & -Y_0{}^D & 1 \end{bmatrix} \begin{bmatrix} \cos\theta & +\sin\theta & 0 \\ -\sin\theta & \cos\theta & 0 \\ 0 & 0 & 1 \end{bmatrix} \quad (4)$$

The computer 51 transforms the coordinates of respective graphic patterns inputted from the digitizer 20 into the coordinates on the rough sketch pattern by using the above mentioned formula (4). When the computer 51 receives as input respective coordinates of the pattern 101A defined by hatched lines of the rough sketch pattern from the digitizer 20, the computer 51 recognizes it as the pattern transformed to the coordinates on the rough sketch coordinate by the operation as expressed in the formula (4). The pattern 101A which has been recognized as the pattern on the rough sketch coordinate is recognized by the computer 51 as a pattern 101B on the shape coordinate by defining a rectangular 102 which circumscribes the pattern 101A and is parallel to $X^H$-$Y^H$ axis and defining a coordinate system which has the origin (point $O_0{}^K$) at the top point 102A which is closest to the origin of the rectangular rough sketch coordinate and axes ($X^K$-$Y^K$ axis) respectively parallel to $X^H$-$Y^H$ axis of the rough sketch coordinate. The above process can be expressed by the formula (5). If it is assumed that the coordinates on the rough sketch coordinate of the origin $O_0{}^K$ (point 102A) of the shape coordinate system ($X_2{}^H, Y_2{}^H$), and the coordinates of an arbitrary point of the rough sketch pattern 101A on the rough sketch coordinate system is $(X_1{}^H, Y_1{}^H)$, the coordinate $(X_3{}^K, Y_3{}^K)$ of this point on the shape coordinate system will be represented by the formula below.

$$[X_3{}^K \; Y_3{}^K \; 1] = [X_1{}^H \; Y_1{}^H \; 1] \begin{bmatrix} 1 & 0 & 0 \\ 0 & 1 & 0 \\ -X_2{}^H & -Y_2{}^H & 1 \end{bmatrix} \quad (5)$$

Contrary to the above, the rough sketch pattern 101A can be recognized as a graphic pattern which is obtained by parallel-displacing the pattern 101B which passes through the origin $O_0{}^K$ of the shape coordinate system and which inscribes the rectangule parallel to $X^H$-$Y^H$ axis to a designated position. The transformation from the shape coordinate to the rough sketch coordinate is carried out according to the following formula:

$$[X_1{}^H \; Y_1{}^H \; 1] = [X_3{}^K \; Y_3{}^K \; 1] \begin{bmatrix} 1 & 0 & 0 \\ 0 & 1 & 0 \\ X_2{}^H & Y_2{}^H & 1 \end{bmatrix} \quad (6)$$

The graphic pattern 101A which has been inputted from the digitizer 20 is processed for transformation as described above to control the rough sketch 101A with the graphic data of the pattern 101B on the shape coordinate system and the parameters $X_2{}^H, Y_2{}^H$ to be used for transformation from the shape coordinate system to the rough sketch coordiante system. In this case, if the rough sketch coordinates and the positional coordinates on the output drum 30 have a 1:1 ratio, then the rough sketch data stored in the computer 51 will be reproduced on the coordinate of the color paper 31 mounted on the output drum 30. As a result, the lay-out conditions designated in the rough sketch pattern of the digitizer 20 can be outputted in a picture image on the color paper 31.

The position, shape and size of the original pictures mounted on the transparent base 11 are inputted from the digitizer 20 to define the original pictures on the base coordinate systems (the coordinate system to define the original picture) according to the method described hereinbelow.

Figure 7D:
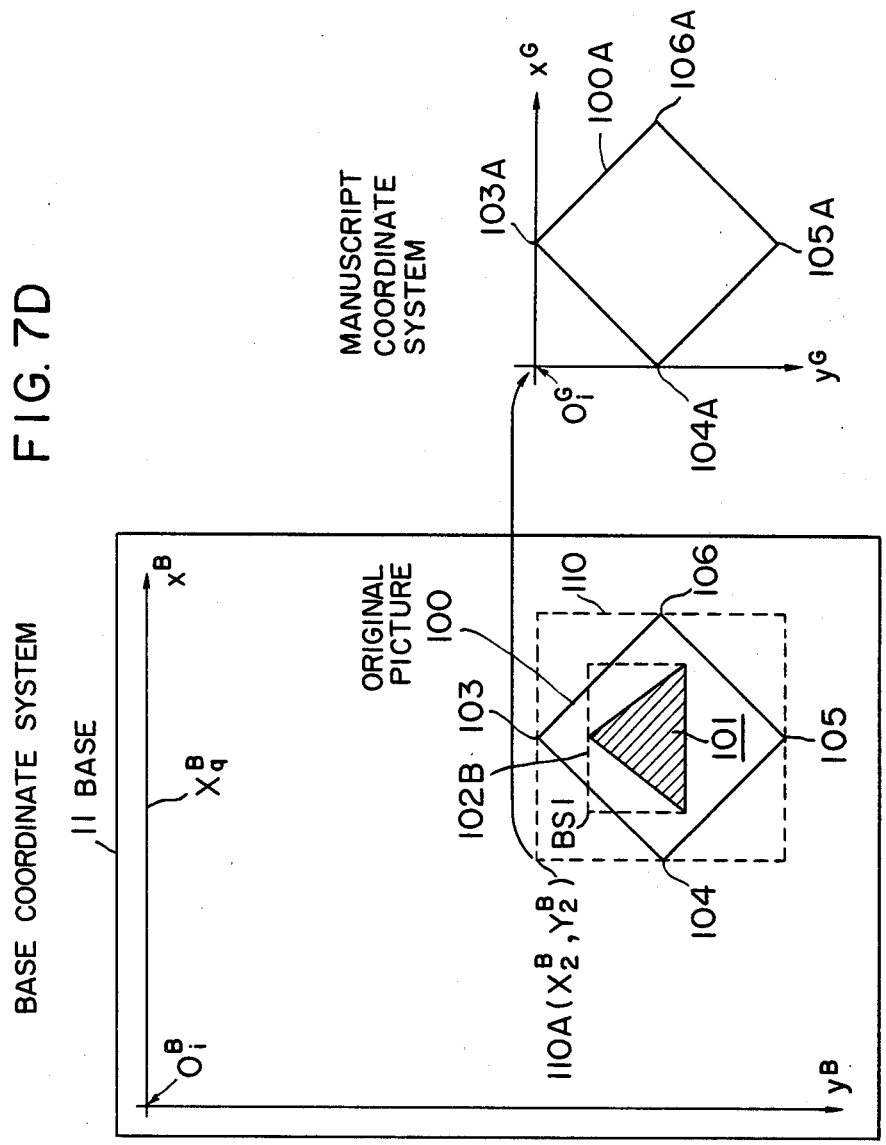

Referring now to FIG. 7D, a transparent base 11 attached to an original picture 100 is mounted on the digitizer 20. In a manner similar to inputting a rough sketch, the coordinates on the digitizer 20 for an origin $O_i^B$ of the coordinate system (or base coordinate system) of the transparent base 11 and a point $X_q^B$ on the $x^B$ axis or the $y^B$ axis of the base coordinate are inputted into the computer 51, the transformation parameters $\theta'$, $-X_0^{D'}$, $-Y_0^{D'}$ for transforming the coordinates on the digitizer 20 to the coordinates (the base coordinates) of the transparent base 11 are obtained in a manner similar to that used for obtaining the parameters $\theta$, $-X_0^D$, $-Y_0^D$ for transforming the coordinates of the digitizer 20 to the coordinates of the rough sketch. The position and size of the original picture 100 on the transparent base 11 attached on the digitizer 20 are recognized as the position, shape and size of the original picture 100 on the transparent base 11 by reading the coordinates of the break points 103 to 106 on the outer periphery of the original picture on the digitizer 20, and transforming the thus read coordinates on the digitizer 20 into the coordinates on the base coordinate system through computation mentioned as (3) and (4) and using the parameters $\theta'$, $-X_0^{D'}$ and $-Y_0^{D'}$ in the computer 51. In a manner similar to that used in the case of rough sketch, a rectangle 110 which circumscribes the original picture 100 and which has sides parallel to either axis $x^B$ or $y^B$ of the base coordinate is defined by the computer 51, and a manuscript coordinate system or the coordinate system which has an axis ($x^G$-$y^G$ axis) respectively parallel to the $x^B$-$y^B$ axis of the base coordinate as an origin (point $O_i^G$) at a vertex 110A or the point closest to the origin $O_i^G$ of the rectangular base coordinate so as to recognize the size and the shape of the original picture 100 on the base coordinate as the diagram 100A on the manuscript coordinate system. In this processing, in the same fashion as that of the rough sketch, if it is assumed that the origin $O_i^G$ of the manuscript coordinate system of the original picture 100 on the transparent base 11 is expressed by the coordinate value ($X_2^B$, $Y_2^B$) on the base coordinate system, then the original picture 100 on the transparent base 11 can be recognized as the result of a parallel displacement of the original picture defined on the manuscript coordinate system by $X_2^B$ in the direction of the axis $x^B$ and by $Y_2^B$ in the direction of the axis $y^B$ on the base coordinate. Then, the transparent base 11 attached to an input manuscript 100 thus recognized is mounted on the input drum 10, but since pin holes are bored on the transparent base 11 for mounting the input drum 10 on the register pins 61A and 61B, the coordinates on the transparent base 11 can be recognized as the coordinates on the input drum 10.

As a result of the aforementioned processing, the output position, shape and size of the original picture on the output drum 30 and the position, the shape and size of the input manuscript 100 mounted on the transparent base 11 on the input drum 10 are recognized in the computer 51.

There arises the need for defining an image output scope and output magnification of the input manuscript for outputting the original picture 100 to the output drum 30 in the shape designated by the rough sketch 101A. The explanation therefor will be given hereinbelow.

In the case where the output magnification S is designated in advance by the console 50 at the time of inputting the rough sketch 101A, the rough sketch diagram 101B defined on the coordinate shown in FIG. 7C is transformed in magnification and projected on the shape 100A of the original picture defined on the manuscript coordinate shown in FIG. 7D. Consequently, the coordinates ($X_4^G$, $Y_4^G$) on the manuscript coordinate of an arbitrary point ($X_3^K$, $Y_3^K$) on the rough sketch 101C defined on the shape coordinates shown in FIG. 8 can be expressed by the formula below:

$$[X_4^G \ Y_4^G \ 1] = [X_3^K \ Y_3^K \ 1] \begin{bmatrix} 1/S & 0 & 0 \\ 0 & 1/S & 0 \\ 0 & 0 & 1 \end{bmatrix} \quad (7)$$

Figure 8:
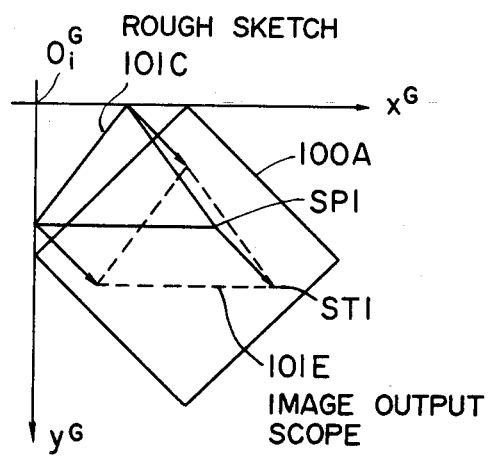
Figure 9:
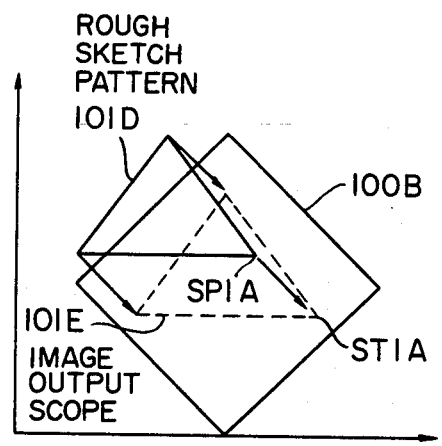

The state of the input manuscript 100A and that of the rough sketch 101C defined on the manuscript coordinate are transformed from the manuscript coordinates to the screen coordinates and displayed on the screen of the graphic display 52. Since the thus displayed rough sketch which is defined on the manuscript coordinate is not established in correspondence with the image output scope, it is necessary to read the coordinates on the input manuscript mounted on the transparent base 11, and to transform it into the coordinates on the manuscript coordinate using the parameters $\theta'$, $-X_0^{D'}$, $-Y_0^{D'}$ and according to the transformation formulae shown in (3) and (4). By transforming the coordinates into that of the screen coordinate system and displaying a cursor on the screen corresponding to the position designated by the digitizer 20, as shown in FIG. 9, the position designated is displaced on the digitizer 20 and the reference point SP1A is designated for the rough sketch pattern 101D on the screen. Similarly, on the input manuscript mounted on the digitizer 20, the reference point ST1 is designated for the input manuscript 100A which corresponds to the reference point SP1 of the rough sketch 101C as shown in FIG. 8. By these designations, the coordinates ($X_5^D$, $Y_5^D$) of the reference point SP1 of the rough sketch pattern 101C on the manuscript coordinate is parallel displaced to the coordinates ($X_6^D$, $Y_6^D$) of the reference point ST1 of the input manuscript so as to define the image output scope 101E on the input manuscript 100A. Simultaneously, the reference point SP1A of the rough sketch pattern 101A is parallel displaced to the reference point ST1A of the input manuscript 100B on the screen of the graphic display 52 corresponding to the reference points SP1 and ST1 so as to define the image output scope 101E on the input manuscript. Through the above processing, the coordinates ($X_3^K$, $Y_3^K$) of an arbitrary point on the rough sketch pattern 101B which is, for instance, defined by the shape coordinate, is transformed to the coordinates on the manuscript coordinates ($X_7^G$, $Y_7^G$) in accordance with the following formula:

$$[X_7^G \ Y_7^G \ 1] = [X_3^K \ Y_3^K \ 1] \begin{bmatrix} 1/S & 0 & 0 \\ 0 & 1/S & 0 \\ 0 & 0 & 1 \end{bmatrix} \begin{bmatrix} 1 & 0 & 0 \\ 0 & 1 & 0 \\ \Delta x_1 & \Delta y_1 & 1 \end{bmatrix} \quad (8)$$

wherein $\Delta x_1 = X_6^D - X_5^D$, $\Delta y_1 = Y_6^D - Y_6^D$. Therefore, if the rough sketch pattern 101B defined in the shape coordinate is newly transformed to the base coordinate by the coordinate transformation processing, the rough sketch diagram 101E defined on the base coordinate will indicate the image output scope of the input manuscript 100. The coordinates of point BS1 on the base coordinate which corresponds to the point 102A on the rough sketch coordinate can be expressed as $X^B = X_2^B + \Delta x_1$, $Y^B = Y_2^B + \Delta y_1$. The coordinates on the rough sketch coordinate of the point 102A can be expressed as $X^H = X_2^H$, $Y^H = Y_2^H$.

On the other hand, if the output magnification S is not designated at the input time of the rough sketch pattern 101A, a magnification which reduces the original picture defined on the manuscript coordinate should be considered (for instance, a magnification of 70%). In other words, if it is assumed that the maximum values of coodinates of the manuscript 100A defined on the manuscript coordinate in the directions of axes $x^G$ and $y^G$ are $X_8^G$ and $Y_8^G$, and if the maximum values of the coordinates of the diagram of the rough sketch pattern 101B defined on the shape coordinate in the directions of axes $X^K$ and $Y^K$ are $X_9^K$ and $Y_9^K$, then a magnification $S_1$ computed by the formula below is selected and the rough sketch 101B on the shape coordinate is defined on the manuscript coordinate.

$$\left. \begin{array}{l} \text{if } X_9^K/X_3^G \geq Y_9^K/Y_8^G, \\ \quad \text{magnification } S_1 \text{ becomes } S_1 \geq X_9^K/X_8^G \\ \text{if } X_9^K/X_8^G \leq Y_9^K/Y_8^G, \\ \quad \text{magnification } S_1 \text{ becomes } S_1 \geq Y_9^K/Y_8^G \end{array} \right\} \quad (9)$$

By this processing, the coordinate $(X_4^G, Y_4^G)$ on the manuscript coordinate which corresponds to the coordinates $(X_3^K, Y_3^K)$ of an arbitrary point on the rough sketch pattern 101B can be expressed on the shape coordinate as is the formula (10).

$$[X_4^G \ Y_4^G \ 1] = [X_3^K \ Y_3^K \ 1] \begin{bmatrix} 1/S_1 & 0 & 0 \\ 0 & 1/S_1 & 0 \\ 0 & 0 & 1 \end{bmatrix} \quad (10)$$

In this way the state of defining the shape 100A and the rough sketch 101C of the original picture are displayed on the graphic display 52 after transforming them from the manuscript coordinate to the screen coordinate of the graphic display 52. However, since the correspondence of the magnification and the output scope between the displayed rough sketch 101D and the original picture 100B is not designated, it is necessary to read the coordinates of the input manuscript on the transparent base 11 attached to the digitizer 20 and transform them to the coordinate values on the manuscript coordinate using the parameters $\theta'$, $-X_0^{D'}$ and $-Y_0^{D'}$ in accordance with the formulae (3) and (4). Then, the cursor is displayed on a position on the screen designated by the digitizer 20 after transformation to the screen coordinate, and is moved to the reference points SN1 and SN2 of the rough sketch pattern 101C as displayed in FIG. 10B so as to designate the point newly as the reference pont. In a similar manner, the reference points PN1 and PN2 which correspond to the reference points SN1 and SN2 of the rough sketch are designated for input in the manuscript on the transparent base 11 mounted on the digitizer 20. By this designation the computer 51 makes the reference points SN1 and SN2 of the rough sketch 101C on the manuscript coordinate correspond with the reference points PN1 and PN2 of the input manuscript 100A. If it is assumed that the coordinates of the reference points PN1 and PN2 of the input manuscript and the reference points SN1 and SN2 of the rough sketch 101C are $SN1 = (X_{10}^G, Y_{10}^G)$, $SN2 = (X_{11}^G, Y_{11}^G)$, $PN1 = (X_{12}^G, Y_{12}^G)$, $PN2 = (X_{13}^G, Y_{13}^G)$, then the average displacement $\Delta x_2$, $\Delta y_2$ and the magnification $S_2$ will be expressed as below.

$$\left. \begin{array}{l} \Delta x_2 = X_{12}^G \ X_{10}^G \\ \Delta y_2 = Y_{12}^G \ Y_{10}^G \end{array} \right\} \quad (11)$$

$$\left. \begin{array}{l} \text{if } |X_{12}^G - X_{13}^G|/|X_{10}^G - X_{11}^G| \leq |Y_{12}^G - Y_{13}^G|/|Y_{10}^G - Y_{11}^G|, \\ \quad \text{magnification } S_2 \text{ becomes } S_2 = |X_{12}^G - X_{13}^G|/|X_{10}^G - X_{11}^G| \\ \text{if } |X_{12}^G - X_{13}^G|/|X_{10}^G - X_{11}^G| > |Y_{12}^G - Y_{13}^G|/|Y_{10}^G - Y_{11}^G|, \\ \quad \text{magnification } S_2 \text{ becomes } S_2 = |Y_{12}^G - Y_{13}^G|/|Y_{10}^G - Y_{11}^G| \end{array} \right\} \quad (12)$$

In this matter the rough sketch 101C on the manuscript coordinate is transformed in magnification and parallel displaced thereon. As a result, the coordinates $(x_3^G, y_3^G)$ on the manuscript coordinate corresponding to the coordinates $(X_3^K, Y_3^K)$ of an abirtrary point on the rough sketch 101B on the shape coordinate can be represented by the formula (13).

$$[X_3^G \ Y_3^G \ 1] = [X_3^K \ Y_3^K \ 1] \begin{bmatrix} 1/S_2 & 0 & 0 \\ 0 & 1/S_2 & 0 \\ 0 & 0 & 1 \end{bmatrix} \begin{bmatrix} 1 & 0 & 0 \\ 0 & 1 & 0 \\ \Delta x_2 & \Delta y_2 & 1 \end{bmatrix} \quad (13)$$

Figure 10A:
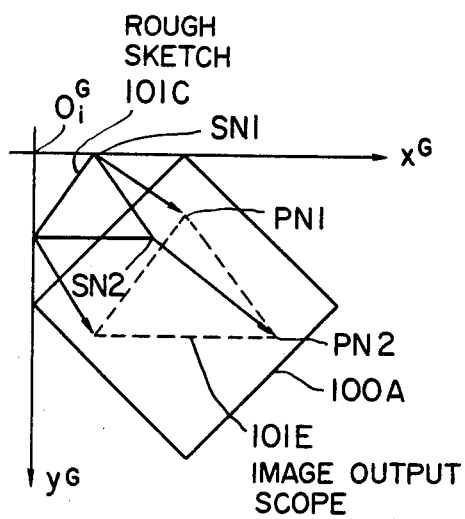
Figure 10B:
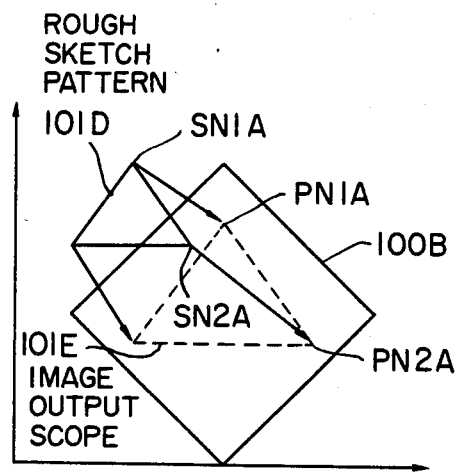

Consequently, the rough sketch 101C on the manuscript coordinate is transformed to a diagram 101E which is made to correspond to the shape 100A of the manuscript. FIG. 10A shows the state. The result is transformed into the screen coordinate, displayed on the graphic display 52 to confirm whether the displayed rough sketch 101E and the original picture 100B are located at the desired positions. FIG. 10B indicates such a state. If they are not correctly corresponding to each other, then the correspondence between the reference points SN1 and SN2 and the reference points PN1 and PN2 are designated again. FIGS. 10A and 10B show the relationship between the manuscript coordinate and the screen coordinate of the original picture 100. A similar relationship holds for the original picture 200.

In short, each coordinate $(X_3^K, Y_3^K)$ of the rough sketch pattern 101B on the shape coordinate is transformed in coordinates according to the formula (14)

$$[X_7^B \ Y_7^B \ 1] = \quad (14)$$

$$[X_3^K \ Y_3^K \ 1] \begin{bmatrix} 1/S_2 & 0 & 0 \\ 0 & 1/S_2 & 0 \\ 0 & 0 & 1 \end{bmatrix} \begin{bmatrix} 1 & 0 & 1 \\ 0 & 1 & 0 \\ X_2^B + \Delta x_2 & Y_2^B + \Delta y_2 & 1 \end{bmatrix}$$

into the base coordinate, and the rough sketch pattern 101E defined on the base coordinate indicates the image output scope of the input manuscript. The output magnification S is shown as $S = S_2$, and the origin $O_0^K$ of the rough sketch 101B on the shape coordinate or the coordinate of the point BS1 on the base coordinate corresponding to the point 102A on the rough sketch coordinate becomes as $X^B = X_2^B + \Delta x_2$, $Y^B = Y_2^B + \Delta y_2$. The coordinates of the origin on the rough sketch coordinate are $X^H = X_2^H$, $Y^H = Y_2^H$. Accordingly, the position, shape for the picture image output of the output drum 30 designated by the output of the rough sketch pattern 101A and the image output scope and the output CP are stored. The graphic data of the original color picture CP stored in the memory becomes as shown in Table 1 for the case of FIG. 11.

TABLE 1

| $X_1$ | $Y_1^S$ | $Y_1^E$ | $X_2$ | $Y_2^S$ | $Y_2^E$ | ... | $X_i$ | $Y_i^S$ | $Y_i^E$ | ... | $X_n$ | $Y_n^S$ | $Y_n^E$ |
|---|---|---|---|---|---|---|---|---|---|---|---|---|---| magnification of the original picture 100 when it is attached on the transparent base 11 and mounted on the input drum 10 are determined. Then, coordinates are correspondingly selected for the origin 102A on the rough sketch coordinate corresponding to the shape coordinate origin $O_0^K$ which transforms the rough sketch 101B on the shape coordinate to the rough sketch 101A on the rough sketch coordinate and for the origin BS1 on the base coordinate which makes it correspond to the image output scope of the original picture on the base coordinate.

Coordinate transformation and coordinate control between devices are carried out in the manner shown above. The operation of the picture image input/output system according to this invention will now be explained.

Graphic codes and positional information necessary for the lay-out of the output picture images are inputted into a computer 51 by using the digitizer 20 and the console 50; the computer 51 produces a graphic pattern according to thus input graphic data, and the produced graphic data is transmitted to the graphic display 52 for display. The operator reviews the graphic pattern while watching the picture frame displayed on the graphic display 52 and if there is any correction or addition to be made, the operator corrects it by using the digitizer 20 and the console 50. The input of the rough sketch is carried out in a manner similar to the one used for rough sketch plotters, and a light pen may be used.

Original color pictures A to D for lay-out output are next mounted on a transparent base 11, and the transparent base 11 is placed at a predetermined position on the digitizer 20. The original color pictures A to D corresponding to the input graphic pattern are sequentially selected according to the commands given to the digitizer 20 and by key operation on the console 50, and the output scope for the original color pictures A to D and the hidden surface processing for the diagram are designated. The output scope can be instructed by designating two points on diagonals if the pattern is a rectangle and by designating a center point if it is a circle. Then the magnification which is necessary for correspondence of the original color pictures A to D with the graphic patterns A' to D' on the output picture is designated and inputted, and simultaneously the parameters for necessary process conditions such as color correction, sharpness enhancement and gradation conversion are inputted by the console 50.

Figure 11:
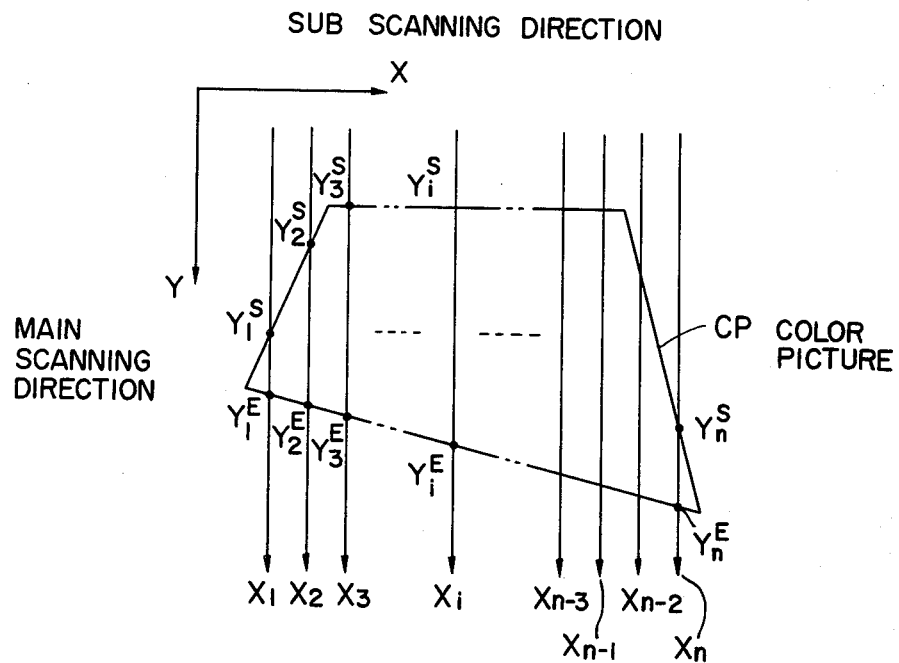
FIG. 11 is an explanatory diagram for an input picture image and the conditions of picture image memory.

Then the computer 51 computes by the main scanning line $X_i$, the start position $Y_i^S$ and end position $Y_i^E$ of the color picture CP on the output drum as shown in FIG. 11 for each unit of the input graphic pattern and stores the result in a memory such as a magnetic disk. Namely, the X-axis position $X_1$ of which a scanning line of the main scanning direction first traverses the color original picture CP is stored, and then the start point $Y_1^S$ and the end position $Y_1^E$ on the Y axis where the scanning line $X_1$ passes on the color original picture CP are stored, respectively. Similarly for the scanning line $X_2$ the start point $Y_2^S$ and the end point $Y_2^E$ of the position $x_2$ on the X axis and the original color picture CP are stored. The graphic data of the original color picture CP stored in the memory becomes as shown in Table 1 for the case of FIG. 11.

The transparent base 11 attached to original color pictures A to D is mounted on the input drum 10 by registering it with the register pins 61A and 61B. If the motor 12 is driven, the input drum 10 (the output drum 30) is rotated in one direction. A rotary encoder 13 is connected to the rotational shaft of the input drum 10, and the output pulses therefrom are inputted to the two address registers via the PLL circuit in the timing control circuit 55 which is controlled by the micro processor 53. One of the address registers is to supervise the absolute coordinate of the rotational direction (main scanning direction) and the other one is to supervise the absolute coordinate of the input picture elements.

Figure 13A:
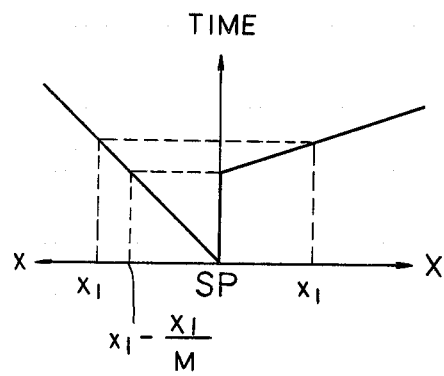
FIGS. 13A and 13B are diagrams for explaining the method used to synchronize an input drum and an output drum.

If it is assumed that the read head 16 of the input drum 10 is separated from the start position SP by $x_1$, and if the output head 32 of the output drum 30 is separated from the start position SP by $X_1$ and the magnification is M, then while the read head 16 moves by x, the output-head 32 moves by M·x. In other words, the ratio of the distances covered by the read head 16 and the output head 32 in the sub scanning direction for a unit time is the magnification M. The controlling method varies depending on the dimensional relationship between $x_1$ and $X_1/M$. When the relationship is expressed by:

$$x_1 \geqq \frac{X_1}{M} \tag{15}$$

as shown in FIG. 13A, the read head 16 is controlled singly to move by $(x_1 - X_1/M)$ and then to move together with the output head 32 simultaneously. In this arrangement, by the time when the read head 16 comes to the start position, the output head 32 comes to the start position SP coincidentally so as to synchronize the sub scanning direction.

Figure 13B:
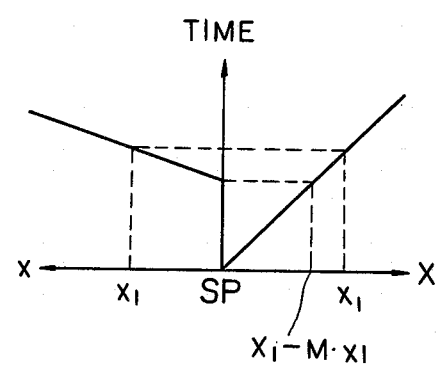

When the following relationship holds:

$$x_1 < \frac{X_1}{M} \tag{16}$$

as shown in FIG. 13B, the output head 32 is controlled singly to move by $(X_1 - M \cdot x_1)$ and then to move together with the read head 16 coincidentally.

Figure 12A:
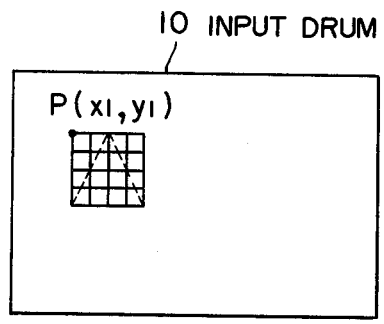
FIGS. 12A and 12B are diagrams to show the input/output aspects for picture images and picture image data.
Figure 12B:
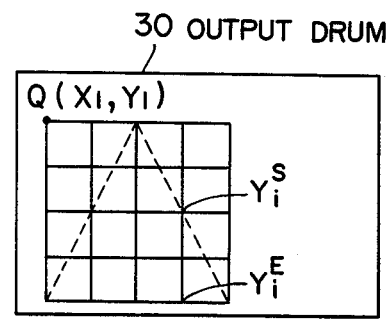

The input/output picture image data in the main scanning direction is supervised as follows. As shown in FIGS. 12A and 12B, the point P $(x_1, y_1)$ is designated as the point closest to the origin of a rectangle circumscribing the graphic pattern on the input drum 10 and is expressed by relative coordinates specified by picture elements of a predetermined unit. A point Q $(X_1, Y_1)$ corresponding to the point P is expressed by the absolute coordinate specified by the picture elements of a predetermined unit on the output drum 30. In this way, the picture element points of input/output picture images can be expressed by the lattice points shown in FIGS. 12A and 12B. The picture element data of the density which has been converted to a digital value by the AD converter 41 is processed by the color processing circuit 42, and then the memory 43 stores successively the start points and the end points thereof at a timing increased from the time when the address register for the y direction of the input drum 10 becomes "y₁". When the memory 43 is used in an output mode, it is made to become effective from the time when the address register becomes "Y₁" in the direction Y, and it is controlled to output the picture elements for the duration from the start point $Y_i^S$ to end point $Y_i^E$ using the point Y₁ as the origin. The buffer memory 43 comprises two systems for each line, and if one of them is used in an input mode, the other assumes an output mode. The output picture image, therefore, is delayed in output by one line than the input picture image.

Figure 14:
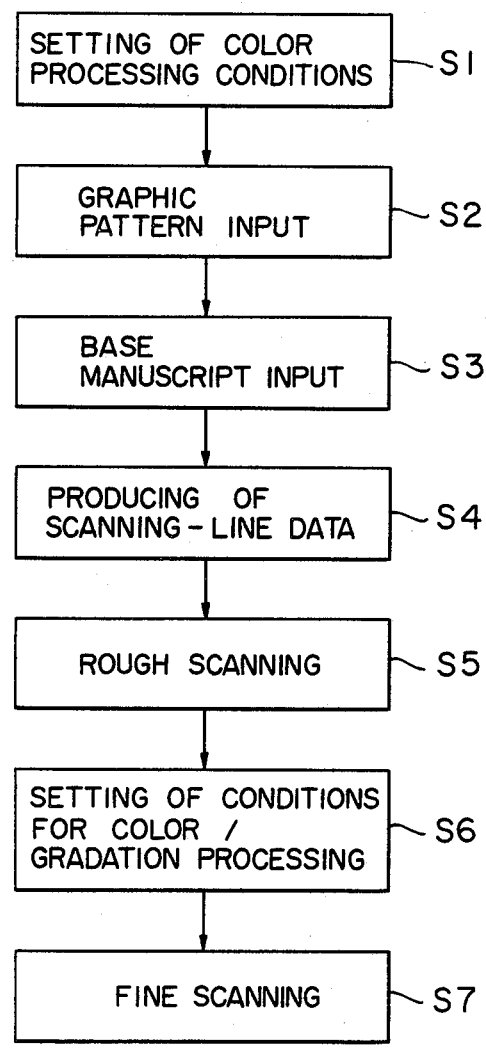
FIG. 14 is a flow chart to explain the operation of the computer system according to this invention.

A chain of operation of the computer 51, the microprocessor 53 and the timing control circuit 55 will now be described with reference to FIG. 14.

At the first step S1, the standard color processing conditions incorporated to the color processing circuit 42 are set with the console 50 by an operator, and then stored in the memory in the computer 51. At the next processing step S2, graphic pattern input to decide the lay-out of the output picture images is carried out by using the digitizer 20 and the console 50, and the input data are stored in the memory in the computer 51 as well as displaying on the graphic display 52. Next, a base manuscript input is carried out by the digitizer 20 and the console 50 in the same manner. Processing of this base manuscript input comprises a trimming input for inputting the trimming conditions of the output image position and output magnification for the input original images and a processing condition input for inputting the color and the gradation processing conditions of output picture images. The input result is stored in the memory in the computer 51 as well as being displayed on the graphic display 52.

Then, the computer 51 produces the data of the scanning lines. This producing process is conducted by inputting the trimming conditions obtained at the above mentioned step S3 and the memory data stored at the step S2, and the scanning-line data obtained as listed in Table 1 are stored in the memory in the computer 51. At the processing step S5, the standard conditions which are stored at the processing step S1 in advance are read out and are transmitted to the color processing circuit 42 through the microprocessor 53. At the same time, the scanning-line data which are produced at the processing step S4 are read out from the memory and then are transmitted to the timing control circuit 55 through the microprocessor 53. As a result of this processing, the timing control circuit 55 transmits the pulse signal to the pulse motor 14 and drives it, thereby moving x-position of the input drum 10. At this time y-position of the input drum 10 is detected by the rotary encoder 13, and the detected data are stored in the address register in the timing control circuit 55. The timing control circuit 55, therefore, is able to control the position for the input drum 10 of the read head 16, and the color-separation signal data of the read head 16 are successively stored in the memory 43. The position data stored in the memory 43 are transmitted to the computer 51 through the microprocessor 53 and stored in the memory of the computer 51, and the above-mentioned processing is repeated a number of times corresponding to the number of input original pictures mounted on the input drum 10. The processing conditions used at the next processing step S7 are obtained according to FIG. 15 as described hereinafter by using the picture image data obtained at the above-mentioned rough scanning and the processing conditions produced at the step S3, and the obtained processing conditions are stored in the memory in the computer 51.

The color and the gradation processing conditions which are stored at the step S6 are read and are transmitted to the color processing circuit 42 through the microprocessor 53, respectively, and the scanning-line data obtained at the step S4 are transmitted to the timing control circuit 55 through the microprocessor 53. The timing control circuit 55 transmits the pulse signals to the pulse motor 14 and 33 and moves the read head 16 and the output head 32 to x-direction and X-direction, respectively. The condition setting at the processing step S6 and fine scanning at the processing step S7 are repeatedly executed at the times corresponding to the number of input original pictures mounted on the input drum 10.

Although the input original pictures comprise 4 types, A to D, in the above embodiment, the shape or number may be chosen arbitrarily and the lay-out of the output picture image may also be arbitrarily inputted. Although color correction and gradation conversion are carried out digitally in the above embodiment, they may be conducted analogically. The input picture images may be read and the lay-out picture images may be outputted onto a scanner of the flat-bed scanning type instead of the cylindrical drum. The output picture images may be either one of color picture image, black-and-white picture image, or halftone image and the recording material may be a color positive film or a black-and-white film. Although in the above mentioned embodiment the scanning speed on the input side is varied for magnifying the picture image output, the scanning speed on the output side may be varied instead.

The picture image signal which has been AID converted by the AID converter 41 is color-processed in the color processing circuit 42 and thus color-processed signal is stored in the memory 43 in the above embodiment, but the AID-converted picture image signal may be stored in the memory, and color-processed in a color processing circuit when it is outputted.

An automatic setting method for picture image processing (such as for color, sharpness and gradation) in the picture image input/output systems according to this invention will now be described.

In order to automatically set above conditions, two types of data, i.e., the attribute information for the input color original picture and rough-scanned data, are used. The attribute data is inputted according to the base manuscript input step which relates each original picture with the position and magnification of output graphic patterns. In these steps, the digitizer 20 and a menu sheet placed thereon or a functional key board are used to input such data in order to determine the type of photographic materials, image type, highlight point coordinates, shadow point coordinates, skin-color point coordinates, gray point coordinates, background color point coordinates, color fogging coordinates, color correction amount, unsharp mask amount, the curve to be chosen from the preset gradation setting curves. The rough-scanned data comprises B(blue), G(green) and R(red) densities of picture elements for each original color picture obtained in the manner described hereinafter. When the base manuscript 11 is mounted on the input drum 10, the computer 51 prepares a drum position control information as shown in FIG. 11 and Table 1 as the output scope of each original color picture has been determined by the coordinate supervising method. The sampling interval for rough-scanned data may be set at 500 [μm]. If the interval is set at a value too small such as 50 [μm], the number of picture element data becomes too large, providing disadvantageous operation timewise. The picture element data thus sampled are stored in an outside memory such as a magnetic disk of a computer system. Sophisticated skill is not required for obtaining such attribute information and rough-scanned data of original color pictures. Any worker can be trained to conduct such an operation.

Advantages of using the attribute information of each original color picture are now discussed hereinafter:

(1) Re: Photographic material of color manuscript

As spectroscopic property and base density of hues of respective photographic material vary, the color processing parameters should be adjusted for each material.

(2) Re: Image type

Parameters for gradation, color and sharpness processing vary depending on the type of images of a picture; such as a portrait, scenery, still life, for instance, processing for a too strong sharpness would not be preferable for a picture centering around a person because grains on the skin become too coarse. Such a picture should be processed with a lesser degree of sharpness. Parameter computation may vary for each of the classified images. For instance, in an image centering around a person, parameters should be selected so as to emphasize tone reproduction mainly on the skin portion of the picture. They may be selected to emphasize tone reproduction of overall picture for other images. It would be very difficult to judge the pattern from the picture element data of the picture image, and errors may occur even if such a technique as patterns recognition is used. But this type of data can be obtained instantaneously if an operator looks at the picture. This type of data therefore should be inputted by an operator to reduce mistakes and time.

(3) Re: Positional coordinates of highlight points and shadow points

If the highlight point position coordinates of a color manuscript is inputted, the density value corresponding to those coordinates can be selected by computation out of the picture image data which have been inputted and scanned to be set as a highlight setting density. The density can be set similarly for shadow points, too. Gradation characteristic can be varied by selecting the density for highlight points and shadow points out of the picture image in this manner.

(4) Re: Positional coodinates of skin color point, gray point and background color point The density of skin color point and background color point can be obtained respectively in the manner mentioned above. Those densities are used to select the color processing and gradation processing parameters for reproducing the skin and gray color point on the output picture image, thereby remarkably improving the quality of the output picture image. Similar advantages are observed in respect of the back ground colors. Parameters can be selected so as to process the gradation in a manner not to intensify a particular background color, thereby enhancing the gradation reproduction of essential portions of a color manuscript.

(5) Re: Color fogging amount

Gradation conversion is conducted between input and output by inputting the color fogging amount of the input color manuscript. Gradation conversion parameters are selected to maintain gray-balance of the output picture image.

(6) Re: Selection of gradation conversion curves

An operator looks at a color manuscript and inputs a curve approximated to a preferable gradation conversion characteristic. By this input, a picture image closer to the instruction given by an operator can be outputted than that when the gradation is automatically set, thereby improving the quality of the output picture image.

(7) Re: Unsharp mask amount (USM)

An operator inputs an unsharp mask amount which he desires to add to the color manuscript. The picture image which has a desired sharpness will be outputted.

(8) Re: Color correction amount

This is the parameter to designate the degree of color correction. The degree of sharpening hues of the color manuscript can be varied by the color correction parameters.

Figure 15:
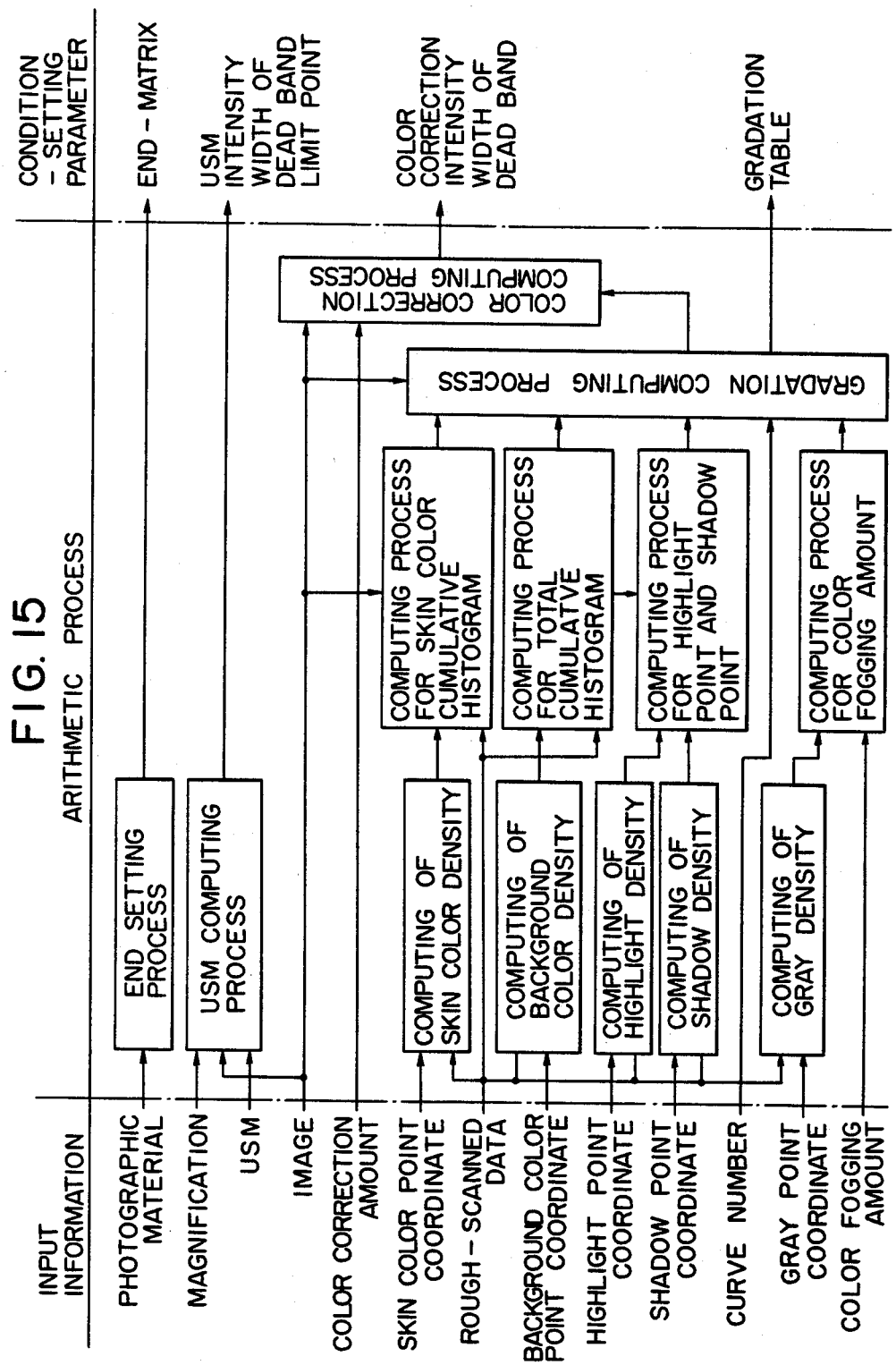
FIG. 15 is a block diagram to show the method of forming parameters for setting the image process conditions.

FIG. 15 indicates how input information is processed to set condition parameters. The color/gradation processing method used herein as an example is disclosed in Japanese Patent Applications No. 62125/1982 and No. 63423/1982. "END" stands for Equivalent Neutral Density.

Referring to FIG. 15, the three-color density corresponding to the skin color point coordinates in the rough-scanned data is obtained from the skin color point coordinates and the rough-scanned data. It is preferable to compute the three-color density as the average of rough-scanned data near the skin color point coordinates. In a manner similar to above, the density for highlight, shadow, gray and background colors is computed, but if the coordinate input has not been carried out, such a density computation is omitted. In the END setting process, where a photographic material of a color manuscript is inputted and an END-matrix is outputted, as different END-matrices exist for different photographic materials, it is preferable to obtain END-matrices for respective photographic materials in advance and to register them. In this step, a photographic material type is inputted and a registered END-matrix is retrieved. In the USM computing process, an unsharp mask amount and the pattern are inputted and if the unsharp mask amount is designated, priority is placed on the unsharp mask amount rather than the magnification and the pattern to compute USM condition-setting parameters. If the unsharp mask amount is not designated, the parameters for setting USM conditions is computed from the magnification and the pattern. Then the result of computation for the pattern and the skin color density is inputted for processing the skin color cumulative histogram. But this computing process for skin color cumulative histogram is executed only when the skin color coordinates are indicated and when the pattern is instructed to focus mainly on a person, although the skin color is not indicated. In other cases computation for the skin color cumulative histogram is not operated. A cumulative histogram is computed out of the skin color point data extracted from the rough-scanned data by setting a center on the result of the computation for the skin color density if there is a skin color point coordinate indication, and on a predetermined value if there is not such an indication according to the method using the probability ellipse disclosed in Japanese Patent Laid-Open No. 156624/1977 and No. 156625/1977 or the method using a rectangle centered on the above mentioned value. The total cumulative histogram is processed by inputting the computation result of the background color density and the rough-scanned data, but if there is no indication for the background colorpoints, all of the rough-scanned data are computed. If there is such an indication, the cumulative histogram is computed out of the rough-scanned data minus the background color data in a manner similar to that for the skin color extraction. In the case of the computation for highlight point and shadow point, the results of the total cumulative histogram computation as well as the computation for highlight density point and shadow point density are inputted. When highlight point coordinates and the shadow point coordinates are indicated, the highlight points and shadow points are determined by the result of the density computation, where if there is not such an indication, highlight point/shadow point may be computed by, for instance, setting the density equivalent to 1% of the total cumulative histograms of the highlight density and that to 99% as the shadow density. The color fogging computation is operated by inputting the result of the gray density computation and the color fogging amount. If there is no indication for both gray point and the color fogging, the color fogging is assumed not to exist and the computation proceeds. If there is indicated a color fogging amount, however, the amount of parallel displacement of the gradation curves is decided so as to correct the color fogging. If there is an indication for a gray point coordinates, the amount of parallel displacement is decided to make the combination of the densities of the result of gray density computation gray. The gradation computing process is divided into two steps, i.e. that for setting a gradation conversion parameter and that for preparing gradation table; as the gradation conversion parameters highlight density, shadow density and a curve number are used. The highlight density and the shadow density are obtained from the result of the computation for highlight point and shadow point. The pattern, the skin color cumulative histogram, the total cumulative histogram and the curve number are inputted, and discriminated to select the most preferable curve for gradation reproduction out of several tens of standard curves which are preset to produce a gradation table by linear transformation (parallel displacement and enlargement/reduction) on thus selected curve using the result of the color fogging amount computation, highlight density and shadow density data.

The method of preparing the gradation table is described hereinbelow.

Figure 16A:
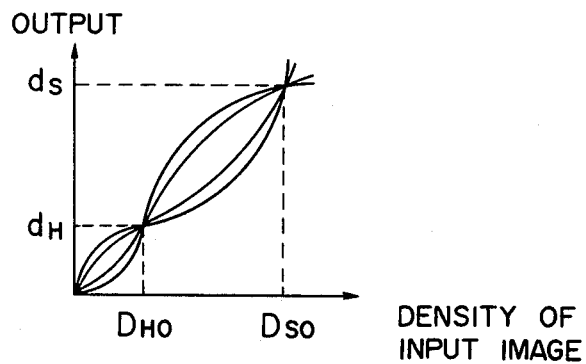
FIGS. 16A through 16C are diagrams to show the density relationship between the input picture image and the output picture image for preparing a gradation table.
Figure 16B:
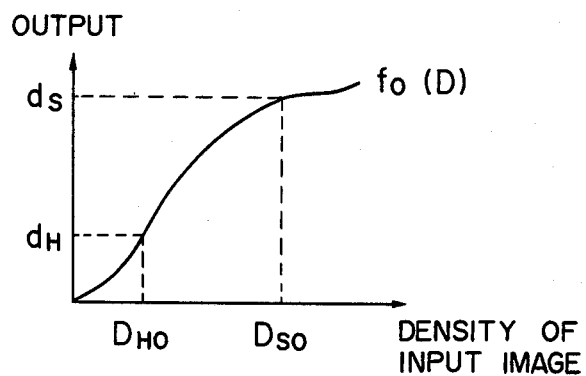
Figure 16C:
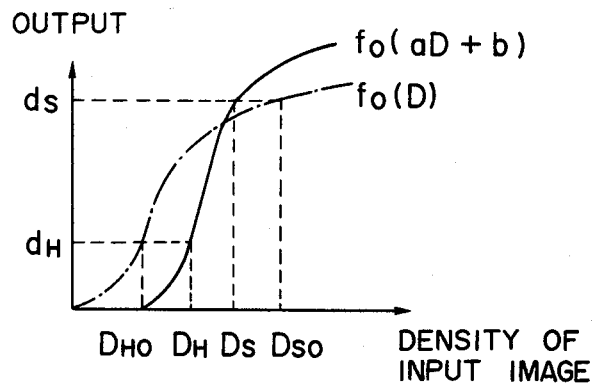

FIG. 16A indicates the group of standard curves which have been set in advance while FIG. 16B indicates a standard curve of $f_0(D)$ which is selected by the method described above. The one-dot chain in FIG. 16C represents the standard curve $f_0(D)$ while the solid line represents the curve $f_0(aD+b)$ which is obtained by linear-transforming the input side of the standard curve from the highlight density and the shadow density data. In FIG. 16C the curves $f_0(D)$ and $f_0(aD+b)$ takes an identical value $d_H$ at respective highlight densities $D_{H0}$ and $D_H$, and an identical value $d_S$ at respective shadow densities $D_{S0}$ and $D_S$.

$$\begin{bmatrix} f_0(D_{H0}) = f_0(aD_H + b) = d_H \\ f_0(D_{S0}) = f_0(aD_S + b) = d_S \end{bmatrix} \quad (17) \\ (18)$$

There holds the above relation expressed by the formulae. Then the formulae (19) and (20) subsequently hold.

$$\begin{bmatrix} aD_H + b = D_{H0} \\ aD_S + b = D_{S0} \end{bmatrix} \quad (19) \\ (20)$$

Out of the above formulae, coefficients a and b are computed as shown below:

$$\begin{bmatrix} a = (D_{S0} - D_{H0})/(D_S - D_H) \\ b = (D_{H0} \cdot D_S - D_H \cdot D_{S0})/(D_S - D_H) \end{bmatrix} \quad (21) \\ (22)$$

The above coefficients a and b determined by the above formulae (21) and (22) are computed from the highlight density $D_{H0}$ and shadow density $D_{S0}$ of the standard curve and a gradation table g(D) is obtained according to the following formula.

$$g(D) = f_0(aD + b) \quad (23)$$

In this manner, a gradation table which maintains the characteristic of standard curves and yet possesses desired highlight density and the shadow density is obtained.

The color correction computing process is executed by inputting the results of computation for images, color correction and gradation. In other words, color correction parameters are selected to make the color sharp for respective cases. The degree of color correction must be determined by considering the particular conditions as some pattern needs sharper color while others not. Further, a color may become turbid by gradation conversion which sometimes increases the output picture image density. The color correction amount data thus determined is transformed into a color correction parameter. The color correction parameters are computed to obtain a weighted means using the results of the pattern, color correction amount and the gradation processing finally.

Parameters of the color correction, the enhancement of sharpness and gradation are thus determined. Each parameter is set in the computer 51 via the micro processor 53 for each unit of the picture image output on the output drum 30 either immediately before the output or the storage in the memory 43. Then the input-/output drums are controlled in a manner described in the foregoing. Although one graphic pattern is singly controlled, as such controlling operation can be sequentially and continuously conducted, lay-out picture images are automatically outputted without requiring the intervention of an operator.

As described in the foregoing, the system according to the present invention does not need the preparation of the rough sketch base paper and masks, stripping after registering (positioning) and the multiple exposure which have been heretofore conducted manually. It can automatically control all of the operation sequentially for each of the output graphic patterns by inputting process condition parameters of each of original color picture and the positional data of the original color picture mounted on a transparent base and the graphic pattern data, thereby remarkably saving labor, time and resources. Unlike the total lay-out re-touch system, it does not require a large scale exterior memory and/or a high speed central processing unit for editing and yet can construct an excellent system capable of a higher performance at a lower cost. The description above concerns the output of a color picture image, but the system may be applied for a processing step at a printing plant by color separating again the color picture image outputs in a color scanner to obtain a color separated film. The color picture image per se can be applied for graphic art field as well as various other fields.

As described in detail in the foregoing, as the positioning method for inputting original picture according to this invention comprises the steps of placing an input original picture on a transparent base, providing register pin holes on the transparent base while providing pins on an input drum and a digitizer and engaging the pins with the pin holes, it is possible to make the coordinates on the input drum to correspond with the coordinates on the digitizer of the input original picture correctly and easily, thereby facilitating the coordinates controlling.

What is claimed is:

1. A picture image input/output apparatus, which comprises:
   (a) a digitizer which inputs graphic information;
   (b) a console which inputs numerical information and operation commands;
   (c) a graphic display of an interactive type which displays a graphic pattern which has been command-inputted by said digitizer and said console;
   (d) a read means which optically reads original pictures mounted on a predetermined position on an input drum;
   (e) a color processing/memory section which first stores the picture image data of said original pictures which have been read by said read means after color correction, sharpness enhancement and gradation conversion process;
   (f) a picture image output means which uses the picture image data from said color processing/memory section to output images on a recording material mounted on an output drum; and
   (g) a computer system which is coupled respectively to said digitizer, said console and said graphic display, supervises correspondence between the coordinates of said digitizer and the coordinates of said output drum, and correspondence between the coordinates of said input drum and said output drum, controls said read means and said picture image output means and controls operational timing of said color processing/memory section, and in which the original pictures on said input drum are outputted in a lay-out form on the recording material of said output drum in graphic patterns and at positions commanded by said digitizer and at designated magnifications, respectively.

2. The picture image/output apparatus as claimed in claim 1, wherein said read means is adapted to optically read the original pictures mounted at predetermined positions on said input drum which is rotated at a given speed in the direction of main scanning by means of a read-head which is driven by a first pulse motor in the direction of sub scanning.

3. The picture image input/output apparatus as claimed in claim 1, wherein said picture image output means includes an output-head which is driven by a second pulse motor to sub scanning direction on the recording material mounted on the output drum rotated at a given speed in main scanning direction.

4. The picture image input/outut apparatus as claimed in claim 2, wherein the movement in said sub scanning direction is conducted by a lead screw coupled with said first pulse motor.

5. The picture image input/output apparatus as claimed in claim 3, wherein the movement in said sub scanning direction is conducted by a lead screw coupled with said second pulse motor.

6. The picture image input/output apparatus as claimed in claim 3, wherein said picture image output means comprises a laser beam printer which converts digital picture image data transmitted from said color processing/memory section into an analog value as a converted signal and exposes the recording material through said output-head.

7. The picture image input/output apparatus as claimed in claim 1, wherein said color processing/memory section stores first said picture image data and then processes for color correction, sharpness enhancement and gradation conversion.

8. A picture image input/output apparatus, which comprises:
   (a) a digitizer which inputs graphic information;
   (b) a console which inputs numerical information and operation commands;
   (c) a graphic display of an interactive type which displays a graphic pattern which has been command-inputted by said digitizer and said console;
   (d) a read means which optically reads original pictures mounted on a predetermined position on an input drum which is rotated in main scanning direction at a given speed by a read-head which is driven by first pulse motor in sub scanning direction;
   (e) a color processing/memory section which digitizes the picture image data of said original pictures read out by said read-head, and first processes the same for color correction, sharpness enhancement and gradation conversion, and then stores the same in either of two memory systems for alternative functions of inputting and outputting data;
   (f) an output-head which is driven by a second pulse motor in the direction of sub scanning on a recording material mounted on an output drum which is rotated at said given speed in main scanning direction;
   (g) a laser beam printer which converts the digital picture image data from said color processing/memory section into analog values as conversion signals and exposes the recording material through said output-head; and
   (h) a computer system coupled to said digitizer, said console and said graphic display respectively, supervises correspondence between the coordinates of said digitizer and said output drum and that between the coordinates of said input drum and said output drum, controls the sub scanning direction position of said read means and the output-head through said first and second pulse motors and controls operational timing of said color processing/memory section, and in which at the time of outputting picture images, said second pulse motor is rotated at a constant rate while the revolution rate of said first pulse motor is varied in correspondence with a designated magnification ratio, and write-in timing of the digital picture image data in the main scanning direction which has been stored in said memory is varied, thereby obtaining a picture image output at the designated magnification, the original pictures on said input drum can be outputted on the recording material on said output drum in lay-out of patterns and at positions which are inputted by said digitizer.

9. The picture image input/output apparatus as claimed in claim 8, wherein said color processing/memory section includes a logarithmic circuit which converts the color separation signal from said read-head into a density signal and then digitizes the same.

10. The picture image input/output apparatus as claimed in claim 8, wherein said computer system comprises a computer coupled with said digitizer, said console and said graphic display and a micro processor of an inferior system which controls said sub scanning direction position as well as the operational timing of said color processing/memory section.

11. The picture image input/output apparatus as claimed in claim 8 in which the correspondence between the coordinate system of said digitizer and that of said input drum is made via a transparent base mounted on the surface of said input drum.

12. The picture image input/output apparatus as claimed in claim 8, wherein said color processing/memory section first stores said digital picture image data in said memory and then processes the picture image data outputted from said memory of output system for color correction, sharpness enhancement and gradation conversion.

13. In a picture image input/output system of the type which enlarges/reduces each of plural original color pictures by a designated magnification, obtains color separation signals for each, processes said color separation signals and sequentially outputs picture images in lay-out on a recording surface of an output drum, the improvement comprises a picture image input/output system which comprises:

a digitizer which inputs graphic information, a console which inputs data commands, and a graphic display of an interactive type which displays graphic patterns in response to commands inputted by said digitizer and said console, and in which respective processing conditions for color correction, sharpness enhancement and gradation conversion of said color separation signals are automatically set by said console which command-inputs attribute information of said original color pictures and which selects one gradation setting curve from a plurality of predetermined gradation curves.

14. The picture image input/output system as claimed in claim 13, wherein the attribute information of said original color pictures include the types of photographic materials of said original color pictures, image type, highlight point coordinates, shadow point coordinates, skin color point coordinates, gray point coordinates, background point coordinates and color correction amount to be added to said original color pictures, unsharp mask amount and color fogging amount and a magnification.

15. A method of positioning an input original picture for a picture image input/output system of the type which outputs an original picture placed on an input drum onto a recording material on an output drum in lay-out and at a position and magnification designated by a digitizer, which is characterized in that register pin holes are provided at plural positions on a base which is flexible as well as mountable on said input drum and the digitizer while register pins are provided on said input drum and digitizer for engaging with said register pin holes respectively, the pin holes and pin being arranged at specific related coordinates so as to thereby position said base at each predetermined position with the engagement between said register pins and said register pin holes facilitating correspondence between the coordinate system on said digitizer of said original picture mounted on said base and that on said input drum.

16. The positioning method as claimed in claim 15, wherein said base is formed with a transparent material in a square sheet form.

17. The positioning method as claimed in claim 15, wherein said register pins and said register pin holes are provided in the number of two respectively.

18. A method of inputting a graphic pattern in a picture image input/output system which receives lay-out original pictures which have been input to an input drum and outputs pictures to a recording material on an output drum in the pattern and position and at magnification designated by a digitizer and a console, comprising the step of inputting the graphic patterns from said digitizer and comparing same with the pictures on said output drum and the step of comparing said original pictures with the pattern input by the step of inputting graphics patterns in position and magnification.

19. The method as claimed in claim 18, wherein said graphic pattern input step comprises causing the coordinates of said digitizer to correspond to the coordinates of said output drum, designating the output size on said output drum by said console, displaying the output size frame converted in a suitable ratio, inputting pattern codes and necessary coordinates by said digitizer as a rough sketch and displaying the pattern at a designated position and in a designated size.

20. The method as claimed in claim 19 which is further provided with a hidden surface elimination processing step of distinguishing between upper and lower graphic patterns and removing overlapping parts of the lower graphic pattern.

21. The method as claimed in claim 18, wherein said base manuscript input step comprises positioning and fixing a transparent base with said original pictures mounted thereon on said digitizer, transforming the coordinate system of said transparent base fixed on said digitizer to the coordinate system of said input drum, and causing the rough sketch inputted by said pattern input step to correspond with the coordinates of said original pictures on said transparent base in magnification.

* * * * *